United States Patent
Wang et al.

(10) Patent No.: US 11,386,499 B2
(45) Date of Patent: Jul. 12, 2022

(54) CAR DAMAGE PICTURE ANGLE CORRECTION METHOD, ELECTRONIC DEVICE, AND READABLE STORAGE MEDIUM

(71) Applicant: Ping An Technology (Shenzhen) Co., Ltd., Guangdong (CN)

(72) Inventors: Jianzong Wang, Guangdong (CN); Chenyu Wang, Guangdong (CN); Jin Ma, Guangdong (CN); Jing Xiao, Guangdong (CN)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 972 days.

(21) Appl. No.: 16/084,993

(22) PCT Filed: Sep. 30, 2017

(86) PCT No.: PCT/CN2017/105002
§ 371 (c)(1),
(2) Date: Sep. 14, 2018

(87) PCT Pub. No.: WO2018/201665
PCT Pub. Date: Nov. 8, 2018

(65) Prior Publication Data
US 2021/0090176 A1    Mar. 25, 2021

(30) Foreign Application Priority Data

May 5, 2017  (CN) .......................... 201710313201.0

(51) Int. Cl.
*G06Q 40/08* (2012.01)
*G06K 9/62* (2022.01)
(Continued)

(52) U.S. Cl.
CPC .......... *G06Q 40/08* (2013.01); *G06K 9/6256* (2013.01); *G06K 9/6267* (2013.01); *G06T 3/60* (2013.01); *G06T 7/30* (2017.01); *G06V 20/13* (2022.01)

(58) Field of Classification Search
CPC .... G06Q 40/08; G06K 9/0063; G06K 9/6256; G06K 9/6267; G06T 3/60; G06T 7/30
(Continued)

(56) References Cited

U.S. PATENT DOCUMENTS

2015/0063685 A1    3/2015 Chen et al.
2016/0104047 A1*  4/2016 Sibiryakov ........ G06K 9/00805
                                                        382/103

FOREIGN PATENT DOCUMENTS

CN     104732225 A  *  6/2015
CN     104732225 A     6/2015
(Continued)

OTHER PUBLICATIONS

English Translation of CN 104732225 A, "Li et al., 2015" (Year: 2015).*
(Continued)

*Primary Examiner* — Ayodeji O Ayotunde

(57) ABSTRACT

Disclosed are a car damage picture angle correction method, an electronic device, and a readable storage medium. The method includes: after receiving a car damage picture to be classified and identified, identifying a rotation category corresponding to the received car damage picture by using a pre-trained picture rotation category identification model; determining a rotation control parameter corresponding to the identified rotation category according to a pre-determined mapping relation between rotation categories and rotation control parameters, the rotation control parameter including a rotation angle and a rotation direction; and rotating the received car damage picture according to the
(Continued)

determined rotation control parameter, so as to generate an angle-normal car damage picture. The disclosure can perform car damage picture angle correction more comprehensively and more effectively with no need to artificially perform angle identification on a car damage picture and to manually rotate the picture, thereby achieving a higher efficiency and accuracy.

17 Claims, 4 Drawing Sheets

(51) Int. Cl.
    *G06T 3/60*     (2006.01)
    *G06T 7/30*     (2017.01)
    *G06V 20/13*     (2022.01)

(58) Field of Classification Search
    USPC .......................................................... 382/309
    See application file for complete search history.

(56) References Cited

FOREIGN PATENT DOCUMENTS

| | | |
|---|---|---|
| CN | 105825243 A | 8/2016 |
| WO | 2010052830 A1 | 5/2010 |
| WO | 2017055878 A1 | 4/2017 |

OTHER PUBLICATIONS

Hiroshi Ninomiya et al., A Study on Deep Manifold Embedding for 3D Object Pose Estimation, Proceedings of the 2016 IEICE General Conference, Mar. 15-18, 2016, p. 102.

Philipp Fischer et al. Image Orientation Estimation with Convolutional Networks, GCPR 2015, LNCS 9358, 2015, pp. 368-378, Springer International Publishing Switzerland 2015.

Srimal Jayawardena, Image Based Automatic Vehicle Damage Detection, A thesis submitted for the degree of Doctor of Philosophy at The Australian National University, Nov. 2013.

Search Report of counterpart European Patent Application No. 17904353.4 dated Nov. 11, 2019.

* cited by examiner

CAR DAMAGE PICTURE ANGLE CORRECTION METHOD, ELECTRONIC DEVICE, AND READABLE STORAGE MEDIUM

CLAIM OF PRIORITY

This application claims priority to China Patent Application No. 2017103132010, filed on May 5, 2017 and entitled "Car Damage Picture Angle Correction Method, Electronic Device, and Readable Storage Medium", which is hereby incorporated by reference in its entirety.

TECHNICAL FIELD

This disclosure relates to the technical field of computers, and more particularly relates to a car damage picture angle correction method, an electronic device, and a readable storage medium.

BACKGROUND

At present, in the field of car insurance claims, in order to increase the claim efficiency, many car insurance companies use picture classification and identification technologies to automatically identify cars and damaged parts in uploaded claim pictures in a car insurance claim system. However, to-be-classified and identified pictures received by the car insurance claim system may frequently include some pictures that are rotated or inverted. Under normal circumstances, a picture may have exchangeable image file format (EXIF) information which contains picture direction information. A picture browser will correspondingly rotate, according to this information, an image during picture displaying, but in some cases, this information will be lost, resulting in a direction error during displaying of some pictures in the car insurance claim system. Therefore, the solution of the industry is that: a claim adjuster artificially checks a picture with a direction display error, and manually rotates the picture with the direction display error through the picture browser, so as to achieve normal classification and identification of pictures. This existing solution is inefficient and error-prone.

SUMMARY

A main objective of the disclosure is to provide a car damage picture angle correction method, an electronic device, and a readable storage medium, intended to efficiently and correctly realize a car damage picture angle correction.

To achieve the above objective, the disclosure provides a car damage picture angle correction method, the method including the following steps:

A. after a car damage picture angle correction system receives a car damage picture to be classified and identified, identifying a rotation category corresponding to the received car damage picture by using a pre-trained picture rotation category identification model;

B. determining a rotation control parameter corresponding to the identified rotation category according to a pre-determined mapping relation between rotation categories and rotation control parameters, the rotation control parameter including a rotation angle and a rotation direction; and C. rotating the received car damage picture according to the determined rotation control parameter, so as to generate an angle-normal car damage picture.

In addition, in order to achieve the above objective, the disclosure also provides an electronic device, including a memory, a processor, and a car damage picture angle correction system stored on the memory and operable on the processor, and when executed by the processor, the car damage picture angle correction system implements the following steps:

After receiving a car damage picture to be classified and identified, identifying a rotation category corresponding to the received car damage picture by using a pre-trained picture rotation category identification model;

determining a rotation control parameter corresponding to the identified rotation category according to a pre-determined mapping relation between rotation categories and rotation control parameters, the rotation control parameter including a rotation angle and a rotation direction; and rotating the received car damage picture according to the determined rotation control parameter, so as to generate an angle-normal car damage picture.

Further, in order to achieve the above objective, the disclosure also provides a computer-readable storage medium, the computer-readable storage medium stores a car damage picture angle correction system, and the car damage picture angle correction system is executable by at least one processor, such that the at least one processor executes the steps of the foregoing car damage picture angle correction method.

According to the car damage picture angle correction method, the electronic device and the readable storage medium proposed in the disclosure, a rotation category corresponding to a car damage picture to be identified is identified by using a pre-trained picture rotation category identification model, a rotation control parameter corresponding to the identified rotation category is determined according to a pre-determined mapping relation between rotation categories and rotation control parameters, and the received car damage picture is rotated according to the determined rotation control parameter. Since the rotation category of each car damage picture can be identified by using a pre-trained picture rotation category identification model, the car damage picture is rotated to an angle-normal picture by finding a rotation control parameter corresponding to the rotation category thereof, it is unnecessary to perform rotation depending on EXIF information in the picture, and car damage picture angle correction can be performed more comprehensively and more effectively with no need to artificially perform angle identification on a car damage picture and to manually rotate the picture, thereby achieving a higher efficiency and accuracy.

BRIEF DESCRIPTION OF THE ACCOMPANYING DRAWINGS

Objectives, functional features, and advantages of this disclosure will be described below in further detail in connection with the accompanying drawings.

DETAILED DESCRIPTION OF ILLUSTRATED EMBODIMENTS

In order to make the technical problems, technical solutions and beneficial effects to be solved in the disclosure clearer, the disclosure will be described in further detail in connection with the accompanying drawings and embodiments. It will be appreciated that the specific embodiments described herein are merely illustrative of the disclosure and are not intended to limit the disclosure.

The disclosure provides a car damage picture angle correction system. Please refer to FIG. 1, which is an illustrative operating environment diagram of a preferred embodiment of a car damage picture angle correction system 10 in accordance with the disclosure.

Figure 1:
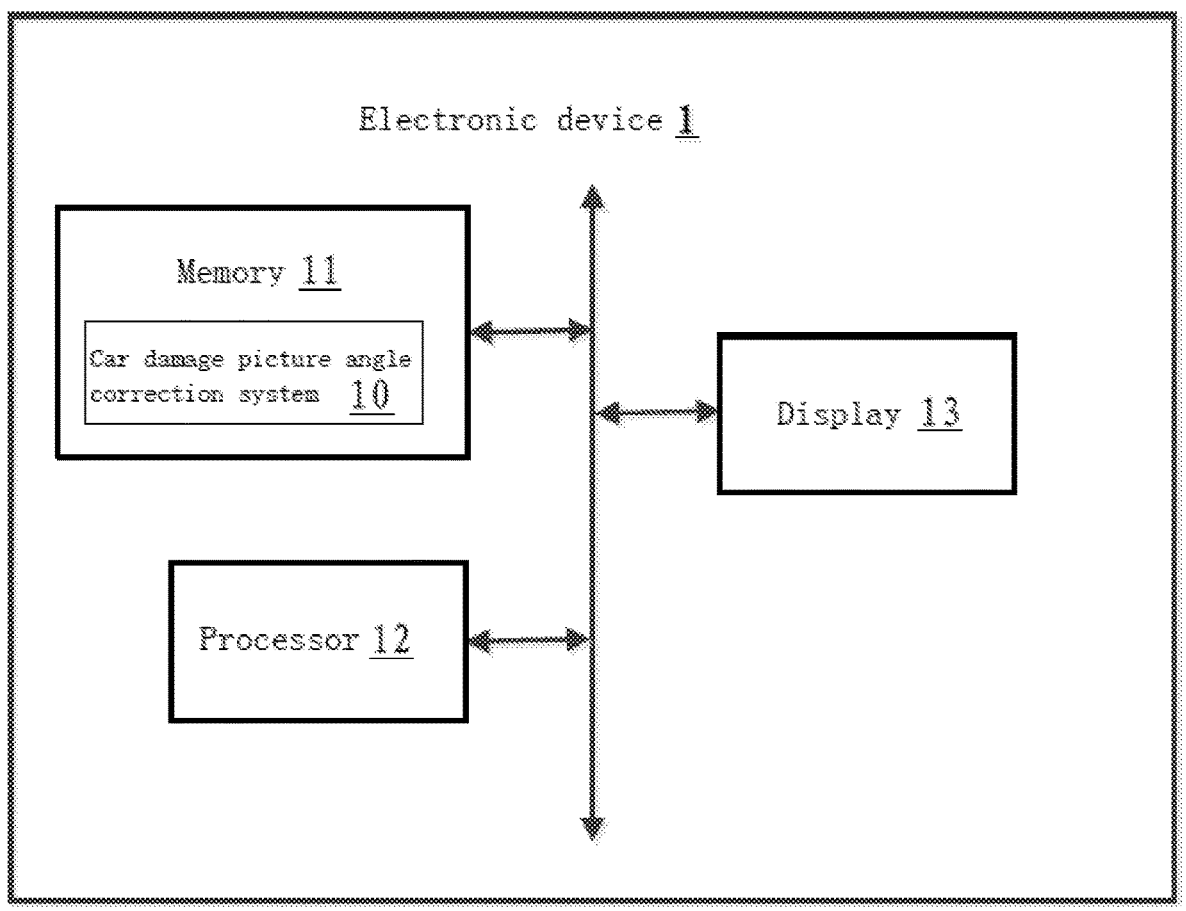
FIG. 1 is an illustrative operating environment diagram of a preferred embodiment of a car damage picture angle correction system 10 in accordance with the disclosure.

In this embodiment, the car damage picture angle correction system 10 is installed and operated in an electronic device 1. The electronic device 1 may include, but is not limited to, a memory 11, a processor 12, and a display 13. FIG. 1 only illustrates an electronic device 1 having components 11 to 13. However, it will be appreciated that all illustrated components are not required to be implemented, but more or fewer components may be implemented instead.

The memory 11 may be an internal storage unit of the electronic device 1, such as a hard disk or a memory of the electronic device 1, in some embodiments. The memory 11 may also be external storage equipment of the electronic device 1 in some other embodiments, such as a plug-in hard disk equipped on the electronic device 1, a smart media card (SMC), a secure digital (SD) card, and a flash card. Further, the memory 11 may also include both an internal storage unit of the electronic device 1 and external storage equipment. The memory 11 is used to store application software and various types of data installed in the electronic device 1, such as program codes of the car damage picture angle correction system 10. The memory 11 may also be used to temporarily store data that has been output or will be output.

The processor 12 may be a central processing unit (CPU), a microprocessor or other data processing chips in some embodiments, used to run program codes or processing data stored in the memory 11, e.g., to execute the car damage picture angle correction system 10 and the like.

The display 13 may be an LED display, a liquid crystal display, a touch liquid crystal display, an organic light-emitting diode (OLED) touch sensor and the like in some embodiments. The display 13 is used to display information processed in the electronic device 1 and to display a visual user interface, such as an application menu interface and an application icon interface. Components 11 to 13 of the electronic device 1 communicate with each other via a system bus.

Figure 2:
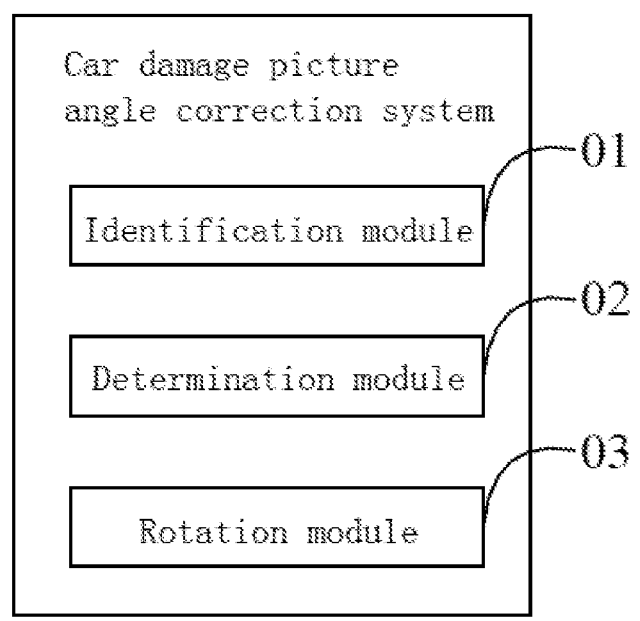
FIG. 2 is an illustrative functional module diagram of an embodiment of a car damage picture angle correction system in accordance with the disclosure.

Please refer to FIG. 2, which is an illustrative functional module diagram of a preferred embodiment of a car damage picture angle correction system 10 in accordance with the disclosure. In this embodiment, the car damage picture angle correction system 10 may be divided into one or more modules, and the one or more modules are stored in the memory 11 and executed by one or more processors (the processor 12 in this embodiment), so as to complete the disclosure. For example, in FIG. 2, the car damage picture angle correction system 10 may be divided into an identification module 01, a determination module 02, and a rotation module 03, and each of the foregoing modules includes a series of computer program instruction segments. These computer program instruction segments may be executed by the processor 12, so as to realize corresponding functions provided by each embodiment of this application. The following description will specifically introduce the functions of the modules 01 to 03.

Referring to FIG. 2, FIG. 2 is an illustrative functional module diagram of an embodiment of a car damage picture angle correction system in accordance with the disclosure.

In an embodiment, the car damage picture angle correction system includes an identification module 01, a determination module 02, and a rotation module 03.

The identification module 01 is configured to identify, after receiving a car damage picture to be classified and identified, a rotation category corresponding to the received car damage picture by using a pre-trained picture rotation category identification model.

In this embodiment, the car damage picture angle correction system receives an automatic picture angle correction request sent by a user and containing a to-be-classified and identified car damage picture, e.g., receives an automatic picture angle correction request sent by a user through a mobile phone, a tablet computer, self-service terminal equipment, or other terminals, e.g., receives an automatic picture angle correction request sent by a user from a pre-installed client in a mobile phone, a tablet computer, self-service terminal equipment, or other terminals, or receives an automatic picture angle correction request sent by a user from a browser system in a mobile phone, a tablet computer, self-service terminal equipment, or other terminals.

After receiving the automatic picture angle correction request sent by the user, the car damage picture angle correction system identifies a received car damage picture by using a pre-trained picture rotation category identification model, and identifies a rotation category corresponding to the received car damage picture, wherein the rotation category may include a parameter such as the deflection direction and angle of the received car damage picture relative to the angle-normal car damage picture, such as a clockwise deflection of 90 degrees or a counterclockwise deflection of 90 degrees. The picture rotation category identification model may be continuously trained, learned, and optimized by identifying a large number of car damage picture samples of different rotation angles in advance, so as to be trained into a model capable of accurately identifying rotation categories corresponding to different car damage pictures. For example, the picture rotation category identification model may adopt a neural networks (NN) model or the like.

The determination module 02 is configured to determine a rotation control parameter corresponding to the identified rotation category according to a pre-determined mapping relation between rotation categories and rotation control parameters, the rotation control parameter including a rotation angle and a rotation direction.

Since the identified rotation category corresponding to the car damage picture includes a parameter such as the deflection direction and angle of a current car damage picture relative to the angle-normal car damage picture, a corresponding rotation control parameter such as a correction direction and angle may be preset according to deflection directions and angles in different rotation categories. For example, if the deflection direction in the identified rotation category corresponding to the car damage picture is clockwise and the deflection angle is 90 degrees, a corresponding rotation control parameter may be set to a counterclockwise rotation direction and a rotation angle of 90 degrees, or a corresponding rotation control parameter may also be set to a clockwise rotation direction and a rotation angle of 270 degrees. The same purpose of rotation control can be achieved. That is to say, the deflected car damage picture can be corrected to an angle-normal car damage picture by rotation. The setting manner for a rotation control parameter is not limited herein.

After the rotation category corresponding to the received car damage picture is identified by using the picture rotation category identification model, a rotation control parameter corresponding to the identified rotation category may be determined according to a pre-determined mapping relation between rotation categories and rotation control parameters, the rotation control parameter including, but not limited to, a rotation angle and a rotation direction.

The rotation module 03 is configured to rotate the received car damage picture according to the determined rotation control parameter, so as to generate an angle-normal car damage picture.

After the rotation control parameter corresponding to the rotation category of the received car damage picture is determined, the received car damage picture may be rotated by using the determined rotation control parameter, so as to rotate the received deflected car damage picture for a certain angle in a corresponding rotation direction, and to automatically correct it as an angle-normal car damage picture. For example, if the deflection direction in the identified rotation category corresponding to the car damage picture is clockwise and the deflection angle is 90 degrees, the determined rotation control parameter corresponding to the rotation category thereof is a counterclockwise rotation direction and a rotation angle of 90 degrees, so that the received car damage picture may be rotated for 90 degrees in a counterclockwise direction, so as to correct the deflected car damage picture as an angle-normal car damage picture.

In this embodiment, a rotation category corresponding to a car damage picture to be identified is identified by using a pre-trained picture rotation category identification model, a rotation control parameter corresponding to the identified rotation category is determined according to a pre-determined mapping relation between rotation categories and rotation control parameters, and the received car damage picture is rotated according to the determined rotation control parameter. Since the rotation category of each car damage picture can be identified by using a pre-trained picture rotation category identification model, the car damage picture is rotated to an angle-normal picture by finding a rotation control parameter corresponding to the rotation category thereof, it is unnecessary to perform rotation depending on EXIF information in the picture, and car damage picture angle correction can be performed more comprehensively and more effectively with no need to artificially perform angle identification on a car damage picture and to manually rotate the picture, thereby achieving a higher efficiency and accuracy.

Further, in other embodiments, the picture rotation category identification model is a deep convolutional neural network (CNN) model, and the training process of the picture rotation category identification model is as follows.

S1. A preset number (e.g., 10,000) of angle-normal car damage picture samples are acquired, wherein for example, a preset number of angle-normal car damage picture samples may be randomly extracted from a preset car damage picture database.

S2. A preset number of angle rotations are performed on each car damage picture sample respectively in accordance with a preset rotation direction (e.g., clockwise or counterclockwise) to generate a rotation picture corresponding to each car damage picture sample, wherein a rotation angle for performing a preset number of angle rotations on each car damage picture sample respectively is n*a, where a represents a preset interval angle between two adjacent angle rotations, n represents an angle rotation sequence, and n is a positive integer; and if 360/a is a positive integer, the preset number is equal to (360/a), or, if 360/a is a decimal number, the preset number is equal to an integer part of (360/a). For example, if an interval angle a between two adjacent angle rotations is set to be 30 degrees, a rotation angle after the first angle rotation of the car damage picture sample is (1*30), i.e., 30 degrees, a rotation angle after the second angle rotation of the car damage picture sample is (2*30), i.e., 60 degrees, . . . , and (360/30) is a positive integer of 12, so the preset number of angle rotations is equal to (360/30), i.e., 12. If an interval angle a between two adjacent angle rotations is set to be 35 degrees, a rotation angle after the first angle rotation of the car damage picture sample is (1*35), i.e., 35 degrees, a rotation angle after the second angle rotation of the car damage picture sample is (2*35), i.e., 70 degrees, . . . , and (360/35) is a decimal number of 10.29, so the preset number of angle rotations is equal to an integer part of (360/35), i.e., 10.

After performing a preset number of angle rotations on each car damage picture sample respectively to generate a rotation picture corresponding to each car damage picture sample, each car damage picture sample and the corresponding rotation picture thereof may be labeled with a corresponding rotation category. The rotation category may include a preset rotation direction (e.g., clockwise direction, or counterclockwise direction), a rotation angle, etc., wherein after performing a preset number of angle rotations in the preset rotation direction, pictures with different rotation angles may be correspondingly labeled with different rotation categories, and pictures with the same rotation direction and the same rotation angle may be correspondingly labeled with the same rotation category, each car damage picture sample corresponding to a first preset rotation category. The first preset rotation category corresponding to each car damage picture sample is regarded as a category that does not rotate the picture. For example, the first preset rotation category may be "clockwise rotation of 0 degree" or "clockwise rotation of 360 degrees".

S3. Each car damage picture sample labeled with a rotation category and a corresponding rotation picture thereof serve as a picture training subset, and all picture training subsets are divided into a training set with a first proportion (e.g., 70%) and a verification set with a second proportion (e.g., 30%).

S4. The training set is used to train the picture rotation category identification model.

S5. The verification set is used to verify the accuracy of the trained picture rotation category identification model. If the accuracy is greater than or equal to a preset accuracy, training is ended. Or, if the accuracy is smaller than a preset accuracy, the number of car damage picture samples is increased, and S2, S3, S4, and S5 are re-executed until the accuracy of the trained picture rotation category identification model is greater than or equal to the preset accuracy.

Figure 3:
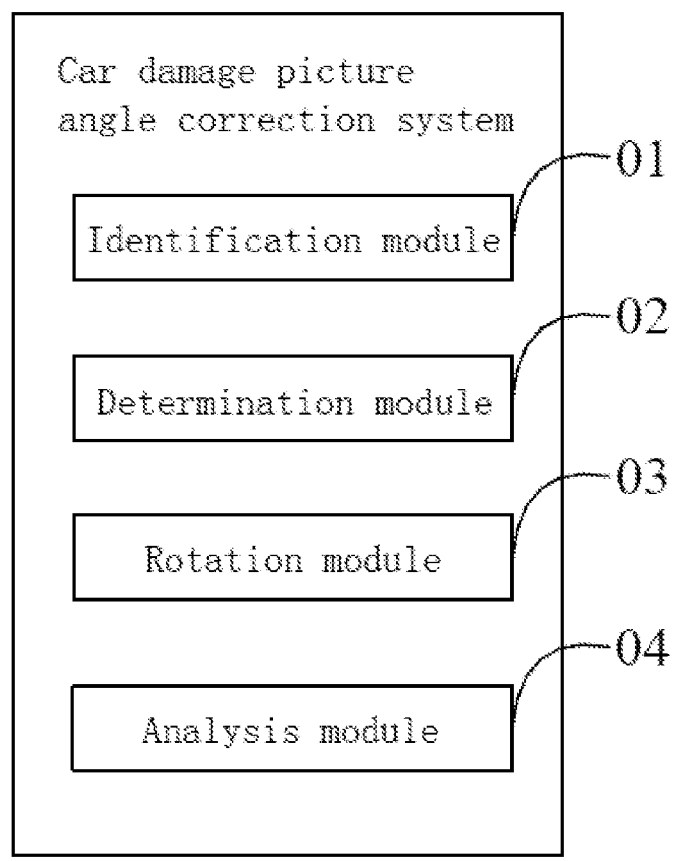
FIG. 3 is an illustrative functional module diagram of another embodiment of a car damage picture angle correction system in accordance with the disclosure.

As shown in FIG. 3, another embodiment of the disclosure provides a car damage picture angle correction system. On the basis of the foregoing embodiment, the car damage picture angle correction system further includes:

an analysis module 04, configured to analyze whether the identified rotation category corresponding to the car damage picture is a second preset rotation category or a third preset rotation category. For example, the second preset rotation category may be "clockwise rotation of 90 degrees", and the third preset rotation category may be "clockwise rotation of 270 degrees"; or, the second preset rotation category may be "clockwise rotation of 270 degrees", and the third preset rotation category may be "clockwise rotation of 90 degrees".

The determination module 02 may be configured to:

determine, if the identified rotation category is a second preset rotation category, a rotation control parameter corresponding to the identified rotation category according to a pre-determined mapping relation between rotation categories and rotation control parameters.

The rotation module 03 may be configured to:

rotate the received car damage picture according to the determined rotation control parameter to generate a rotation picture to be secondarily identified.

The identification module 01 is further configured to: identify, by using the pre-trained picture rotation category identification model, a secondary identification rotation category corresponding to the rotation picture to be secondarily identified.

The determination module 02 is further configured to: determine, if the secondary identification rotation category is a first preset rotation category, the rotation picture to be secondarily identified as an angle-normal car damage picture; determine, if the secondary identification rotation category is a fourth preset rotation category (e.g., the fourth preset rotation category may be "clockwise rotation of 180 degrees", or, "counterclockwise rotation of 180 degrees"), the identified rotation category as a third preset rotation category, determine a rotation control parameter corresponding to the third preset rotation category according to the pre-determined mapping relation between rotation categories and rotation control parameters, and call the rotation module 03 to rotate the received car damage picture according to the determined rotation control parameter to generate an angle-normal car damage picture.

Since it is found, from a large number of actual application case statistics for car damage picture angle correction, that when a rotation category corresponding to the received car damage picture is a certain rotation category, it is prone to identification errors or confusions, resulting in angle correction errors. For example, it is extremely prone to identification confusion errors when a rotation category "clockwise rotation of 90 degrees" corresponding to a car damage picture and a rotation category "clockwise rotation of 270 degrees" are identified by using the picture rotation category identification model, resulting in car damage picture angle correction errors. Therefore, in this embodiment, when analyzing that the identified rotation category corresponding to the car damage picture is a second preset rotation category or a third preset rotation category (e.g., "clockwise rotation of 90 degrees" or "clockwise rotation of 270 degrees") prone to confusion errors, the received car damage picture is rotated according to a rotation control parameter corresponding to the identified rotation category. Further, the rotated picture is used as a rotation picture to be secondarily identified, and the secondary identification of the rotation picture to be secondarily identified is continued. If the secondary identification rotation category is a first preset rotation category (e.g., "clockwise rotation of 0 degree" or "clockwise rotation of 360 degrees"), it is indicated that the rotation picture to be secondarily identified is an angle-normal car damage picture, that is, no confusion errors occur. If the secondary identification rotation category is a fourth preset rotation category, it may be determined that confusion errors occur when the rotation category of the received car damage picture is first identified, and it may be further determined that a correct rotation category of this car damage picture is different from the rotation category that was first identified, and is a rotation category that is easily confused with the rotation category that was first identified.

In this embodiment, a rotation category corresponding to a car damage picture prone to confusion errors is identified and verified by using a secondary identification manner, so as to further improve the accuracy of car damage picture angle correction.

Further, in other embodiments, the determination module 02 is further configured to:

directly determine, when the rotation category corresponding to the received car damage picture does not pertain to confusion-prone and error-prone rotation categories if the identified rotation category corresponding to the car damage picture is neither a second preset rotation category nor a third preset rotation category, a rotation control parameter corresponding to the identified rotation category according to the pre-determined mapping relation between rotation categories and rotation control parameters, and call the rotation module 03 to rotate the received car damage picture according to the determined rotation control parameter, so as to efficiently and accurately generate an angle-normal car damage picture.

Further, in other embodiments, the analysis module 04 is further configured to:

analyze whether the identified rotation category corresponding to the received car damage picture is a first preset rotation category (e.g., the first preset rotation category may be "clockwise rotation of 0 degree", or "clockwise rotation of 360 degrees");

determine, if the identified rotation category is the first preset rotation category, the received car damage picture as an angle-normal car damage picture, thereby making it unnecessary to rotate the picture; and call, when the received car damage picture is not an angle-normal car damage picture, that is, it is necessary to perform an angle rotation correction operation if the identified rotation category is not the first preset rotation category, the determination module 02 and the rotation module 03.

The disclosure further provides a car damage picture angle correction method.

Figure 4:
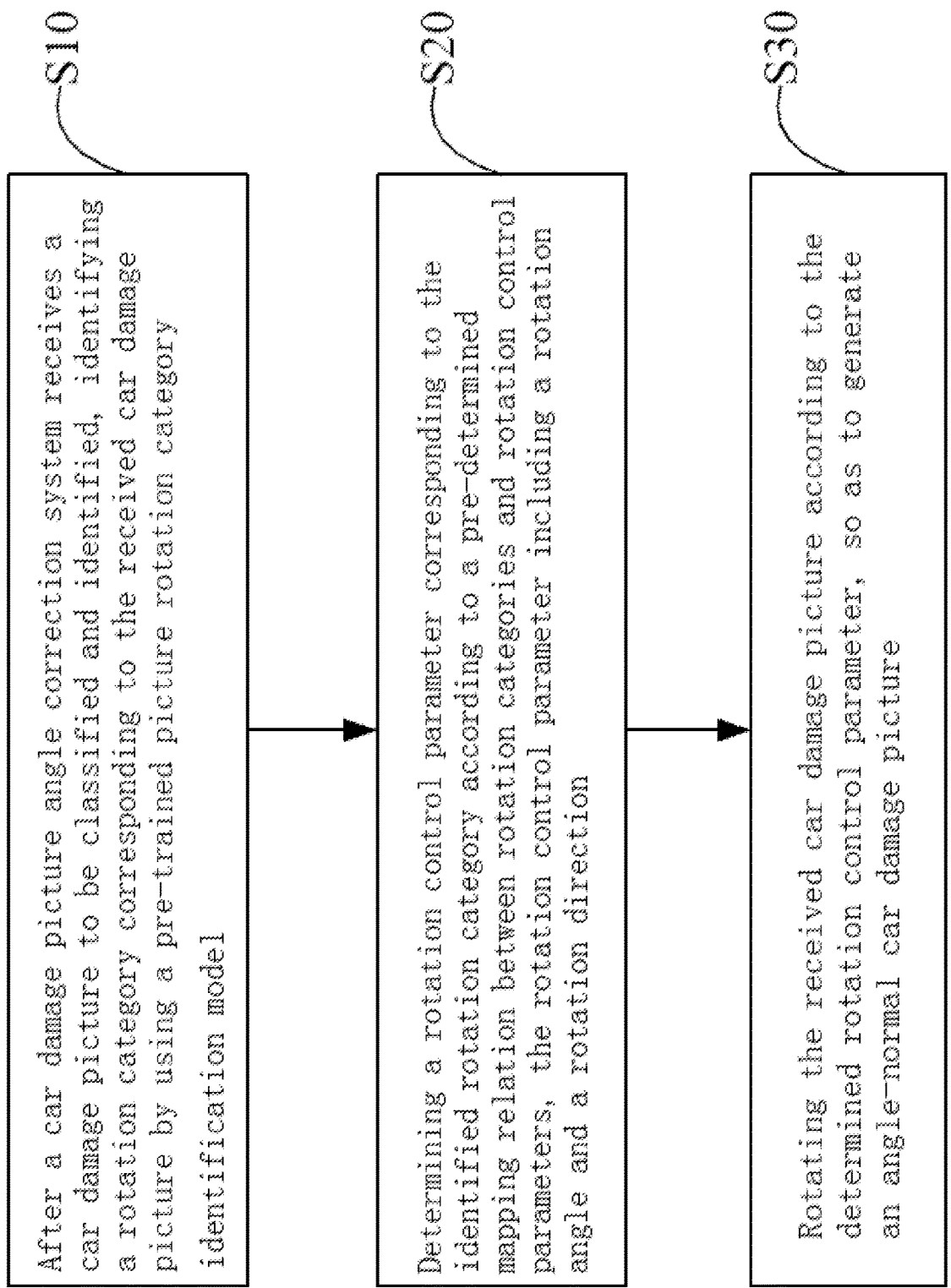
FIG. 4 is an illustrative flowchart of an embodiment of a car damage picture angle correction method in accordance with the disclosure.

Referring to FIG. 4, FIG. 4 is an illustrative flowchart of an embodiment of a car damage picture angle correction method in accordance with the disclosure.

In an embodiment, the car damage picture angle correction method includes the steps as follows.

S10: After a car damage picture angle correction system receives a car damage picture to be classified and identified, a rotation category corresponding to the received car damage picture is identified by using a pre-trained picture rotation category identification model.

In this embodiment, the car damage picture angle correction system receives an automatic picture angle correction request sent by a user and containing a to-be-classified and identified car damage picture, e.g., receives an automatic picture angle correction request sent by a user through a mobile phone, a tablet computer, self-service terminal equipment, or other terminals, e.g., receives an automatic picture angle correction request sent by a user from a pre-installed client in a mobile phone, a tablet computer, self-service terminal equipment, or other terminals, or receives an automatic picture angle correction request sent by a user from a browser system in a mobile phone, a tablet computer, self-service terminal equipment, or other terminals.

After receiving the automatic picture angle correction request sent by the user, the car damage picture angle correction system identifies a received car damage picture by using a pre-trained picture rotation category identification model, and identifies a rotation category corresponding to the received car damage picture, wherein the rotation category may include a parameter such as the deflection direction and angle of the received car damage picture relative to the angle-normal car damage picture, such as a clockwise deflection of 90 degrees or a counterclockwise deflection of 90 degrees. The picture rotation category identification model may be continuously trained, learned, and optimized by identifying a large number of car damage picture samples of different rotation angles in advance, so as to be trained into a model capable of accurately identifying rotation categories corresponding to different car damage pictures. For example, the picture rotation category identification model may adopt an NN model or the like.

S20: A rotation control parameter corresponding to the identified rotation category is determined according to a pre-determined mapping relation between rotation categories and rotation control parameters, the rotation control parameter including a rotation angle and a rotation direction.

Since the identified rotation category corresponding to the car damage picture includes a parameter such as the deflection direction and angle of a current car damage picture relative to the angle-normal car damage picture, a corresponding rotation control parameter such as a correction direction and angle may be preset according to deflection directions and angles in different rotation categories. For example, if the deflection direction in the identified rotation category corresponding to the car damage picture is clockwise and the deflection angle is 90 degrees, a corresponding rotation control parameter may be set to a counterclockwise rotation direction and a rotation angle of 90 degrees, or a corresponding rotation control parameter may also be set to a clockwise rotation direction and a rotation angle of 270 degrees. The same purpose of rotation control can be achieved. That is to say, the deflected car damage picture can be corrected to an angle-normal car damage picture by rotation. The setting manner for a rotation control parameter is not limited herein.

After the rotation category corresponding to the received car damage picture is identified by using the picture rotation category identification model, a rotation control parameter corresponding to the identified rotation category may be determined according to a pre-determined mapping relation between rotation categories and rotation control parameters, the rotation control parameter including, but not limited to, a rotation angle and a rotation direction.

S30: The received car damage picture is rotated according to the determined rotation control parameter, so as to generate an angle-normal car damage picture.

After the rotation control parameter corresponding to the rotation category of the received car damage picture is determined, the received car damage picture may be rotated by using the determined rotation control parameter, so as to rotate the received deflected car damage picture for a certain angle in a corresponding rotation direction, and to automatically correct it as an angle-normal car damage picture. For example, if the deflection direction in the identified rotation category corresponding to the car damage picture is clockwise and the deflection angle is 90 degrees, the determined rotation control parameter corresponding to the rotation category thereof is a counterclockwise rotation direction and a rotation angle of 90 degrees, so that the received car damage picture may be rotated for 90 degrees in a counterclockwise direction, so as to correct the deflected car damage picture as an angle-normal car damage picture.

In this embodiment, a rotation category corresponding to a car damage picture to be identified is identified by using a pre-trained picture rotation category identification model, a rotation control parameter corresponding to the identified rotation category is determined according to a pre-determined mapping relation between rotation categories and rotation control parameters, and the received car damage picture is rotated according to the determined rotation control parameter. Since the rotation category of each car damage picture can be identified by using a pre-trained picture rotation category identification model, the car damage picture is rotated to an angle-normal picture by finding a rotation control parameter corresponding to the rotation category thereof, it is unnecessary to perform rotation depending on EXIF information in the picture, and car damage picture angle correction can be performed more comprehensively and more effectively with no need to artificially perform angle identification on a car damage picture and to manually rotate the picture, thereby achieving a higher efficiency and accuracy.

Further, in other embodiments, the picture rotation category identification model is a deep CNN model, and the training process of the picture rotation category identification model is as follows.

S1. A preset number (e.g., 10,000) of angle-normal car damage picture samples are acquired, wherein for example, a preset number of angle-normal car damage picture samples may be randomly extracted from a preset car damage picture database.

S2. A preset number of angle rotations are performed on each car damage picture sample respectively in accordance with a preset rotation direction (e.g., clockwise or counterclockwise) to generate a rotation picture corresponding to each car damage picture sample, wherein a rotation angle for performing a preset number of angle rotations on each car damage picture sample respectively is n*a, where a represents a preset interval angle between two adjacent angle rotations, n represents an angle rotation sequence, and n is a positive integer; and if 360/a is a positive integer, the preset number is equal to (360/a), or if 360/a is a decimal number, the preset number is equal to an integer part of (360/a). For example, if an interval angle a between two adjacent angle rotations is set to be 30 degrees, a rotation angle after the first angle rotation of the car damage picture sample is (1*30), i.e., 30 degrees, a rotation angle after the second angle rotation of the car damage picture sample is (2*30), i.e., 60 degrees, . . . , and (360/30) is a positive integer of 12, so the preset number of angle rotations is equal to (360/30), i.e., 12. If an interval angle a between two adjacent angle rotations is set to be 35 degrees, a rotation angle after the first angle rotation of the car damage picture sample is (1*35), i.e., 35 degrees, a rotation angle after the second angle rotation of the car damage picture sample is (2*35), i.e., 70 degrees, . . . , and (360/35) is a decimal number of 10.29, so the preset number of angle rotations is equal to an integer part of (360/35), i.e., 10.

After performing a preset number of angle rotations on each car damage picture sample respectively to generate a rotation picture corresponding to each car damage picture sample, each car damage picture sample and the corresponding rotation picture thereof may be labeled with a corresponding rotation category. The rotation category may include a preset rotation direction (e.g., clockwise direction, or counterclockwise direction), a rotation angle, etc., wherein after performing a preset number of angle rotations in the preset rotation direction, pictures with different rotation angles may be correspondingly labeled with different rotation categories, and pictures with the same rotation direction and the same rotation angle may be correspondingly labeled with the same rotation category, each car damage picture sample corresponding to a first preset rotation category. The first preset rotation category corresponding to each car damage picture sample is regarded as a category that does not rotate the picture. For example, the first preset rotation category may be "clockwise rotation of 0 degree" or "clockwise rotation of 360 degrees".

S3. Each car damage picture sample labeled with a rotation category and a corresponding rotation picture thereof serve as a picture training subset, and all picture training subsets are divided into a training set with a first proportion (e.g., 70%) and a verification set with a second proportion (e.g., 30%).

S4. The training set is used to train the picture rotation category identification model.

S5. The verification set is used to verify the accuracy of the trained picture rotation category identification model. If the accuracy is greater than or equal to a preset accuracy, training is ended. Or, if the accuracy is smaller than a preset accuracy, the number of car damage picture samples is increased, and S2, S3, S4, and S5 are re-executed until the accuracy of the trained picture rotation category identification model is greater than or equal to the preset accuracy.

Further, in other embodiments, between S10 and S20, the method further includes:

analyzing whether the identified rotation category corresponding to the received car damage picture is a first preset rotation category (e.g., the first preset rotation category may be "clockwise rotation of 0 degree", or "clockwise rotation of 360 degrees");

determining, if the identified rotation category is the first preset rotation category, the received car damage picture as an angle-normal car damage picture, thereby making it unnecessary to rotate the picture; and executing, when the received car damage picture is not an angle-normal car damage picture, that is, it is necessary to perform an angle rotation correction operation if the identified rotation category is not the first preset rotation category, S20 and S30.

Further, in other embodiments, after S10, the method further includes:

analyzing whether the identified rotation category corresponding to the car damage picture is a second preset rotation category or a third preset rotation category. For example, the second preset rotation category may be "clockwise rotation of 90 degrees", and the third preset rotation category may be "clockwise rotation of 270 degrees"; or, the second preset rotation category may be "clockwise rotation of 270 degrees", and the third preset rotation category may be "clockwise rotation of 90 degrees".

S20 may include:

determining, if the identified rotation category is a second preset rotation category, a rotation control parameter corresponding to the identified rotation category according to a pre-determined mapping relation between rotation categories and rotation control parameters.

S30 may include:

rotating the received car damage picture according to the determined rotation control parameter to generate a rotation picture to be secondarily identified.

After S30, the method further includes:

identifying, by using the pre-trained picture rotation category identification model, a secondary identification rotation category corresponding to the rotation picture to be secondarily identified;

determining, if the secondary identification rotation category is a first preset rotation category, the rotation picture to be secondarily identified as an angle-normal car damage picture; and determining, if the secondary identification rotation category is a fourth preset rotation category (e.g., the fourth preset rotation category may be "clockwise rotation of 180 degrees", or, "counterclockwise rotation of 180 degrees"), the identified rotation category as the third preset rotation category, determining a rotation control parameter corresponding to the third preset rotation category according to the pre-determined mapping relation between rotation categories and rotation control parameters, and rotating the received car damage picture according to the determined rotation control parameter to generate an angle-normal car damage picture.

Since it is found, from a large number of actual application case statistics for car damage picture angle correction, that when a rotation category corresponding to the received car damage picture is a certain specific rotation category, it is prone to identification errors or confusions, resulting in angle correction errors. For example, it is extremely prone to identification confusion errors when a rotation category "clockwise rotation of 90 degrees" corresponding to a car damage picture and a rotation category "clockwise rotation of 270 degrees" are identified by using the picture rotation category identification model, resulting in car damage picture angle correction errors. Therefore, in this embodiment, when analyzing that the identified rotation category corresponding to the car damage picture is a second preset rotation category or a third preset rotation category (e.g., "clockwise rotation of 90 degrees" or "clockwise rotation of 270 degrees") prone to confusion errors, the received car damage picture is rotated according to a rotation control parameter corresponding to the identified rotation category. Further, the rotated picture is used as a rotation picture to be secondarily identified, and the secondary identification of the rotation picture to be secondarily identified is continued. If the secondary identification rotation category is a first preset rotation category (e.g., "clockwise rotation of 0 degree" or "clockwise rotation of 360 degrees"), it is indicated that the rotation picture to be secondarily identified is an angle-normal car damage picture, that is, no confusion errors occur. If the secondary identification rotation category is a fourth preset rotation category, it may be determined that confusion errors occur when the rotation category of the received car damage picture is first identified, and it may be further determined that a correct rotation category of this car damage picture is different from the rotation category that was first identified, and is a rotation category that is easily confused with the rotation category that was first identified.

In this embodiment, a rotation category corresponding to a car damage picture prone to confusion errors is identified and verified by using a secondary identification manner, so as to further improve the accuracy of car damage picture angle correction.

Further, in other embodiments, S20 further includes:

directly determining, when the rotation category corresponding to the received car damage picture does not pertain to confusion-prone and error-prone rotation categories if the identified rotation category corresponding to the car damage picture is neither a second preset rotation category nor a third preset rotation category, a rotation control parameter corresponding to the identified rotation category according to the pre-determined mapping relation between rotation categories and rotation control parameters, and rotating the received car damage picture according to the determined rotation control parameter, so as to efficiently and accurately generate an angle-normal car damage picture.

In addition, the disclosure also provides a computer-readable storage medium, wherein the computer-readable storage medium stores a car damage picture angle correction system, the car damage picture angle correction system is executable by at least one processor, such that the at least one processor executes the steps of the car damage picture angle correction method in the foregoing embodiment, and the specific implementation process of S10, S20, S30 and the like of the car damage picture angle correction method is as mentioned above, and will not be elaborated herein.

It should be noted that, as used herein, the terms "including", "containing", or any other variations thereof are intended to cover a non-exclusive inclusion, such that a process, method, article, or device including a series of elements includes not only such elements, but also other elements that are not explicitly listed, or elements that are inherent to such process, method, article, or device. In the case of no more limitations, the presence of another identical element in a process, method, article, or device including an element defined by a sentence "including a . . . " is not excluded.

By the description of the foregoing embodiments, it will be evident to those of skill art that the methods according to the foregoing embodiments can be implemented by means of software plus the necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, or an optical disc) and may include multiple instructions that, when executed, can cause terminal equipment (e.g., a mobile phone, a computer, a server, an air conditioner, or network equipment), to execute the methods described in the various embodiments of the disclosure.

The preferred embodiments of the disclosure have been described above with reference to the accompanying drawings, and it is not intended to limit the scope of the disclosure. The foregoing numbering of embodiments of the disclosure is intended for illustrative purposes only, and is not indicative of the pros and cons of these embodiments. In addition, although a logical sequence is shown in the flowcharts, in some cases, the illustrated or described steps may be performed in an order other than that order.

Those skilled in the art can implement the disclosure by various modifications without departing from the scope and spirit of the disclosure. For example, the features as one embodiment can be used in another embodiment to obtain yet another embodiment. Any modifications, equivalent replacements, and improvements made within the technical concept of the disclosure shall fall within the patentable scope of the disclosure.

What is claimed is:

1. A car damage picture angle correction method, comprising the following steps:
    A. after a car damage picture angle correction system receives a car damage picture to be classified and identified, identifying a rotation category corresponding to the received car damage picture by using a pre-trained picture rotation category identification model;
    B. determining a rotation control parameter corresponding to the identified rotation category according to a pre-determined mapping relation between rotation categories and rotation control parameters, the rotation control parameter comprising a rotation angle and a rotation direction; and
    C. rotating the received car damage picture according to the determined rotation control parameter, so as to generate an angle-normal car damage picture; wherein after step A, the method further comprising:
    analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;
    step B comprising: determining, if the identified rotation category is a second preset rotation category, a rotation control parameter corresponding to the identified rotation category according to a pre-determined mapping relation between rotation categories and rotation control parameters;
    step C comprising: rotating the received car damage picture according to the determined rotation control parameter to generate a rotation picture to be secondarily identified;
    after step C, the method further comprising:
    identifying, by using the pre-trained picture rotation category identification model, a secondary identification rotation category corresponding to the rotation picture to be secondarily identified;
    determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; and
    determining, if the secondary identification rotation category is a fourth preset rotation category, the identified rotation category corresponding to the car damage picture as a third preset rotation category, determining a rotation control parameter corresponding to the third preset rotation category according to the pre-determined mapping relation between rotation categories and rotation control parameters, and rotating the received car damage picture according to the determined rotation control parameter to generate an angle-normal car damage picture, wherein the fourth preset rotation category is clockwise rotation of 180 degrees or counterclockwise rotation of 180 degrees.

2. The car damage picture angle correction method of claim 1, wherein the picture rotation category identification model is a deep convolutional neural network model, and the training process of the picture rotation category identification model is as follows:
    A1. acquiring a preset number of angle-normal car damage picture samples;
    A2. performing a preset number of angle rotations on each car damage picture sample respectively in accordance with a preset rotation direction to generate a rotation picture corresponding to each car damage picture sample, and labeling each car damage picture sample and the corresponding rotation picture thereof with a corresponding rotation category, wherein each car damage picture sample is correspondingly labeled with a first preset rotation category;

A3. taking each car damage picture sample labeled with a rotation category and a corresponding rotation picture thereof as a picture training subset, and dividing all picture training subsets into a training set with a first proportion and a verification set with a second proportion;

A4. training the picture rotation category identification model by using the training set; and A5. verifying the accuracy of the trained picture rotation category identification model by using the verification set, if the accuracy is greater than or equal to a preset accuracy, ending training, or, if the accuracy is smaller than a preset accuracy, increasing the number of car damage picture samples, and re-executing S2, S3, S4, and S5.

3. The car damage picture angle correction method of claim 2, wherein a rotation angle for one-time angle rotation of the car damage picture sample is a; if 360/a is a positive integer, a preset number of the angle rotations for each car damage picture sample is equal to (360/a); or, if 360/a is a decimal number, the preset number is equal to an integer part of (360/a).

4. The car damage picture angle correction method of claim 2, after step A, the method further comprising:
analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;
step B comprising: determining, if the identified rotation category is a second preset rotation category, a rotation control parameter corresponding to the identified rotation category according to a pre-determined mapping relation between rotation categories and rotation control parameters;
step C comprising: rotating the received car damage picture according to the determined rotation control parameter to generate a rotation picture to be secondarily identified;
after step C, the method further comprising:
identifying, by using the pre-trained picture rotation category identification model, a secondary identification rotation category corresponding to the rotation picture to be secondarily identified;
determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; and
determining, if the secondary identification rotation category is a fourth preset rotation category, the identified rotation category corresponding to the car damage picture as a third preset rotation category, determining a rotation control parameter corresponding to the third preset rotation category according to the pre-determined mapping relation between rotation categories and rotation control parameters, and rotating the received car damage picture according to the determined rotation control parameter to generate an angle-normal car damage picture, wherein the fourth preset rotation category is clockwise rotation of 180 degrees or counterclockwise rotation of 180 degrees.

5. The car damage picture angle correction method of claim 3, after step A, the method further comprising:
analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;
step B comprising: determining, if the identified rotation category is a second preset rotation category, a rotation control parameter corresponding to the identified rotation category according to a pre-determined mapping relation between rotation categories and rotation control parameters;
step C comprising: rotating the received car damage picture according to the determined rotation control parameter to generate a rotation picture to be secondarily identified;
after step C, the method further comprising:
identifying, by using the pre-trained picture rotation category identification model, a secondary identification rotation category corresponding to the rotation picture to be secondarily identified;
determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; and
determining, if the secondary identification rotation category is a fourth preset rotation category, the identified rotation category corresponding to the car damage picture as a third preset rotation category, determining a rotation control parameter corresponding to the third preset rotation category according to the pre-determined mapping relation between rotation categories and rotation control parameters, and rotating the received car damage picture according to the determined rotation control parameter to generate an angle-normal car damage picture, wherein the fourth preset rotation category is clockwise rotation of 180 degrees or counterclockwise rotation of 180 degrees.

6. The car damage picture angle correction method of claim 1, wherein step B further comprises:
determining, if the identified rotation category corresponding to the car damage picture is neither a second preset rotation category nor a third preset rotation category, a rotation control parameter corresponding to the identified rotation category according to the pre-determined mapping relation between rotation categories and rotation control parameters, and executing step C.

7. An electronic device, comprising a memory, a processor, and a car damage picture angle correction system stored on the memory and operable on the processor, and when being executed by the processor, the car damage picture angle correction system implementing the following steps:
after receiving a car damage picture to be classified and identified, identifying a rotation category corresponding to the received car damage picture by using a pre-trained picture rotation category identification model;

determining a rotation control parameter corresponding to the identified rotation category according to a pre-determined mapping relation between rotation categories and rotation control parameters, the rotation control parameter comprising a rotation angle and a rotation direction; and rotating the received car damage picture according to the determined rotation control parameter, so as to generate an angle-normal car damage picture; wherein the processor is further configured to execute the car damage picture angle correction system to implement the following steps:

analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;

determining, if the identified rotation category is a second preset rotation category, a rotation control parameter corresponding to the identified rotation category according to a pre-determined mapping relation between rotation categories and rotation control parameters; determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; determining, if the secondary identification rotation category is a fourth preset rotation category, the identified rotation category corresponding to the car damage picture as a third preset rotation category, and determining a rotation control parameter corresponding to the third preset rotation category according to the pre-determined mapping relation between rotation categories and rotation control parameters, wherein the fourth preset rotation category is clockwise rotation of 180 degrees or counterclockwise rotation of 180 degrees;

rotating the received car damage picture according to the determined rotation control parameter to generate a rotation picture to be secondarily identified; and identifying, by using the pre-trained picture rotation category identification model, a secondary identification rotation category corresponding to the rotation picture to be secondarily identified.

8. The electronic device of claim 7, wherein the picture rotation category identification model is a deep convolutional neural network model, and the training process of the picture rotation category identification model is as follows:

A1. acquiring a preset number of angle-normal car damage picture samples;

A2. performing a preset number of angle rotations on each car damage picture sample respectively in accordance with a preset rotation direction to generate a rotation picture corresponding to each car damage picture sample, and labeling each car damage picture sample and the corresponding rotation picture thereof with a corresponding rotation category, wherein each car damage picture sample is correspondingly labeled with a first preset rotation category;

A3. taking each car damage picture sample labeled with a rotation category and a corresponding rotation picture thereof as a picture training subset, and dividing all picture training subsets into a training set with a first proportion and a verification set with a second proportion;

A4. training the picture rotation category identification model by using the training set; and A5. verifying the accuracy of the trained picture rotation category identification model by using the verification set, if the accuracy is greater than or equal to a preset accuracy, ending training, or, if the accuracy is smaller than a preset accuracy, increasing the number of car damage picture samples, and re-executing S2, S3, S4, and S5.

9. The electronic device of claim 8, wherein a rotation angle for one-time angle rotation of the car damage picture sample is a; if 360/a is a positive integer, a preset number of the angle rotations for each car damage picture sample is equal to (360/a); or, if 360/a is a decimal number, the preset number is equal to an integer part of (360/a).

10. The electronic device of claim 8, wherein the processor is further configured to execute the car damage picture angle correction system to implement the following steps:

analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;

determining, if the identified rotation category is a second preset rotation category, a rotation control parameter corresponding to the identified rotation category according to a pre-determined mapping relation between rotation categories and rotation control parameters; determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; determining, if the secondary identification rotation category is a fourth preset rotation category, the identified rotation category corresponding to the car damage picture as a third preset rotation category, and determining a rotation control parameter corresponding to the third preset rotation category according to the pre-determined mapping relation between rotation categories and rotation control parameters, wherein the fourth preset rotation category is clockwise rotation of 180 degrees or counterclockwise rotation of 180 degrees;

rotating the received car damage picture according to the determined rotation control parameter to generate a rotation picture to be secondarily identified; and identifying, by using the pre-trained picture rotation category identification model, a secondary identification rotation category corresponding to the rotation picture to be secondarily identified.

11. The electronic device of claim 9, wherein the processor is further configured to execute the car damage picture angle correction system to implement the following steps:

analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;

determining, if the identified rotation category is a second preset rotation category, a rotation control parameter corresponding to the identified rotation category according to a pre-determined mapping relation between rotation categories and rotation control parameters; determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; determining, if the secondary identification rotation category is a fourth preset rotation category, the identified rotation category corresponding to the car damage picture as a third preset rotation category, and determining a rotation control parameter corresponding to the third preset rotation category according to the pre-determined mapping relation between rotation categories and rotation control parameters, wherein the fourth preset rotation category is clockwise rotation of 180 degrees or counterclockwise rotation of 180 degrees;

rotating the received car damage picture according to the determined rotation control parameter to generate a rotation picture to be secondarily identified; and identifying, by using the pre-trained picture rotation category identification model, a secondary identification rotation category corresponding to the rotation picture to be secondarily identified.

12. A non-transitory computer-readable storage medium, storing a car damage picture angle correction system, wherein the car damage picture angle correction system is executable by at least one processor, such that the at least one processor executes the following steps:
  A. after the car damage picture angle correction system receives a car damage picture to be classified and identified, identifying a rotation category corresponding to the received car damage picture by using a pre-trained picture rotation category identification model;
  B. determining a rotation control parameter corresponding to the identified rotation category according to a pre-determined mapping relation between rotation categories and rotation control parameters, the rotation control parameter comprising a rotation angle and a rotation direction; and
  C. rotating the received car damage picture according to the determined rotation control parameter, so as to generate an angle-normal car damage picture; wherein the processor is further configured to execute the car damage picture angle correction system to implement the following steps:
  analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;

determining, if the identified rotation category is a second preset rotation category, a rotation control parameter corresponding to the identified rotation category according to a pre-determined mapping relation between rotation categories and rotation control parameters; determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; determining, if the secondary identification rotation category is a fourth preset rotation category, the identified rotation category corresponding to the car damage picture as a third preset rotation category, and determining a rotation control parameter corresponding to the third preset rotation category according to the pre-determined mapping relation between rotation categories and rotation control parameters, wherein the fourth preset rotation category is clockwise rotation of 180 degrees or counterclockwise rotation of 180 degrees;

rotating the received car damage picture according to the determined rotation control parameter to generate a rotation picture to be secondarily identified; and identifying, by using the pre-trained picture rotation category identification model, a secondary identification rotation category corresponding to the rotation picture to be secondarily identified.

13. The non-transitory computer-readable storage medium of claim 12, wherein the picture rotation category identification model is a deep convolutional neural network model, and the training process of the picture rotation category identification model is as follows:
  A1. acquiring a preset number of angle-normal car damage picture samples;
  A2. performing a preset number of angle rotations on each car damage picture sample respectively in accordance with a preset rotation direction to generate a rotation picture corresponding to each car damage picture sample, and labeling each car damage picture sample and the corresponding rotation picture thereof with a corresponding rotation category, wherein each car damage picture sample is correspondingly labeled with a first preset rotation category;
  A3. taking each car damage picture sample labeled with a rotation category and a corresponding rotation picture thereof as a picture training subset, and dividing all picture training subsets into a training set with a first proportion and a verification set with a second proportion;
  A4. training the picture rotation category identification model by using the training set; and
  A5. verifying the accuracy of the trained picture rotation category identification model by using the verification set, if the accuracy is greater than or equal to a preset accuracy, ending training, or, if the accuracy is smaller than a preset accuracy, increasing the number of car damage picture samples, and re-executing S2, S3, S4, and S5.

14. The non-transitory computer-readable storage medium of claim 13, wherein a rotation angle for one-time angle rotation of the car damage picture sample is a; if 360/a is a positive integer, a preset number of the angle rotations for each car damage picture sample is equal to (360/a); or, if 360/a is a decimal number, the preset number is equal to an integer part of (360/a).

15. The non-transitory computer-readable storage medium of claim 13, wherein the processor is further configured to execute the car damage picture angle correction system to implement the following steps:

analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;

determining, if the identified rotation category is a second preset rotation category, a rotation control parameter corresponding to the identified rotation category according to a pre-determined mapping relation between rotation categories and rotation control parameters; determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; determining, if the secondary identification rotation category is a fourth preset rotation category, the identified rotation category corresponding to the car damage picture as a third preset rotation category, and determining a rotation control parameter corresponding to the third preset rotation category according to the pre-determined mapping relation between rotation categories and rotation control parameters, wherein the fourth preset rotation category is clockwise rotation of 180 degrees or counterclockwise rotation of 180 degrees;

rotating the received car damage picture according to the determined rotation control parameter to generate a rotation picture to be secondarily identified; and identifying, by using the pre-trained picture rotation category identification model, a secondary identification rotation category corresponding to the rotation picture to be secondarily identified.

16. The non-transitory computer-readable storage medium of claim 14, wherein the processor is further configured to execute the car damage picture angle correction system to implement the following steps:

analyzing whether the identified rotation category corresponding to the car damage picture is a second preset rotation category or a third preset rotation category, wherein the second preset rotation category is clockwise rotation of 90 degrees, and the third preset rotation category is clockwise rotation of 270 degrees; or, the second preset rotation category is clockwise rotation of 270 degrees, and the third preset rotation category is clockwise rotation of 90 degrees;

determining, if the identified rotation category is a second preset rotation category, a rotation control parameter corresponding to the identified rotation category according to a pre-determined mapping relation between rotation categories and rotation control parameters; determining, if the secondary identification rotation category is a first preset rotation category, the rotation picture to be secondarily identified as an angle-normal car damage picture, wherein the first preset rotation category is clockwise rotation of 0 degree or clockwise rotation of 360 degrees; determining, if the secondary identification rotation category is a fourth preset rotation category, the identified rotation category corresponding to the car damage picture as a third preset rotation category, and determining a rotation control parameter corresponding to the third preset rotation category according to the pre-determined mapping relation between rotation categories and rotation control parameters, wherein the fourth preset rotation category is clockwise rotation of 180 degrees or counterclockwise rotation of 180 degrees;

rotating the received car damage picture according to the determined rotation control parameter to generate a rotation picture to be secondarily identified; and identifying, by using the pre-trained picture rotation category identification model, a secondary identification rotation category corresponding to the rotation picture to be secondarily identified.

17. The non-transitory computer-readable storage medium of claim 12, wherein step B further comprises:

determining, if the identified rotation category corresponding to the car damage picture is neither a second preset rotation category nor a third preset rotation category, a rotation control parameter corresponding to the identified rotation category according to the pre-determined mapping relation between rotation categories and rotation control parameters, and executing step C.

* * * * *